(12) United States Patent
Pontone et al.

(10) Patent No.: US 12,350,898 B2
(45) Date of Patent: Jul. 8, 2025

(54) METHOD AND SYSTEM FOR APPLYING A SEALING AGENT TO THE SURFACE OF AN INTERNAL CAVITY OF A PNEUMATIC TIRE

(71) Applicant: Bridgestone Europe NV/SA [BE/BE], Zaventem (BE)

(72) Inventors: Roberto Pontone, Rome (IT); Alfonso Di Egidio, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 0 days.

(21) Appl. No.: 18/816,499

(22) Filed: Aug. 27, 2024

(65) Prior Publication Data

US 2024/0416603 A1 Dec. 19, 2024

Related U.S. Application Data

(62) Division of application No. 16/764,122, filed as application No. PCT/IB2018/060281 on Dec. 16, 2018, now Pat. No. 12,070,919.

(30) Foreign Application Priority Data

Dec. 20, 2017 (IT) .......................... 102017000147547

(51) Int. Cl.
  *B29D 30/06* (2006.01)
(52) U.S. Cl.
  CPC .. *B29D 30/0685* (2013.01); *B29D 2030/0694* (2013.01)
(58) Field of Classification Search
  CPC ........ B29D 30/0685; B29D 2030/0634; B29D 2030/0635; B29D 2030/0686;
  (Continued)

(56) References Cited

U.S. PATENT DOCUMENTS

| | | |
|---|---|---|
| 5,942,059 A | 8/1999 | Wulker et al. |
| 2003/0046992 A1 | 3/2003 | Caretta |

(Continued)

FOREIGN PATENT DOCUMENTS

| | | |
|---|---|---|
| CN | 104684772 A | 6/2015 |
| EP | 3085523 A1 | 10/2016 |

(Continued)

OTHER PUBLICATIONS

Keyence LJ-V7000 Series High-Speed 2D/3D Laser Scanner Brochure, 2016.

*Primary Examiner* — Sedef E Paquette
(74) *Attorney, Agent, or Firm* — Patterson Intellectual Property Law, PC

(57) ABSTRACT

A method for applying a sealing agent to a surface of an internal cavity of a pneumatic tire includes inserting an optoelectronic device into the internal cavity and rotating the tire at least 360 degrees about a first axis to acquire captured images and perform a three-dimensional surface scan of various portions of the surface that are uniformly distributed 360 degrees about the first axis, and thereby identify x, y, and z reference coordinates of various points into which each portion is divided as a function of the respective images. An interior surface profile is determined from the images and the identified reference coordinates, an applicator device including a nozzle is inserted into the internal cavity, and the applicator device is driven as a function of the identified three-dimensional reference coordinates of the entire internal cavity to maintain a constant distance between the applicator device and the surface.

9 Claims, 5 Drawing Sheets

(58) Field of Classification Search
CPC .... B29D 2030/0694; B29D 2030/0695; B29D 2030/0697; B29C 73/16; B29C 73/22; B60C 19/12
USPC .......................................... 156/115; 152/503
See application file for complete search history.

(56) References Cited

U.S. PATENT DOCUMENTS

| | | |
|---|---|---|
| 2005/0264796 A1 | 12/2005 | Shaw et al. |
| 2008/0024602 A1 | 1/2008 | Linnenkohl et al. |
| 2010/0243127 A1 | 9/2010 | Chebli et al. |
| 2015/0107743 A1 | 4/2015 | Seong |
| 2016/0339656 A1 | 11/2016 | Jo |
| 2017/0291379 A1 | 10/2017 | Yukawa et al. |
| 2018/0200977 A1 | 7/2018 | Yukawa et al. |
| 2018/0328819 A1 | 11/2018 | Boffa et al. |
| 2019/0061295 A1 | 2/2019 | Ooshima et al. |
| 2020/0047569 A1 | 2/2020 | De Stasio et al. |

FOREIGN PATENT DOCUMENTS

| | | |
|---|---|---|
| JP | 2010274481 A | 12/2010 |
| WO | 2019123201 A1 | 6/2019 |

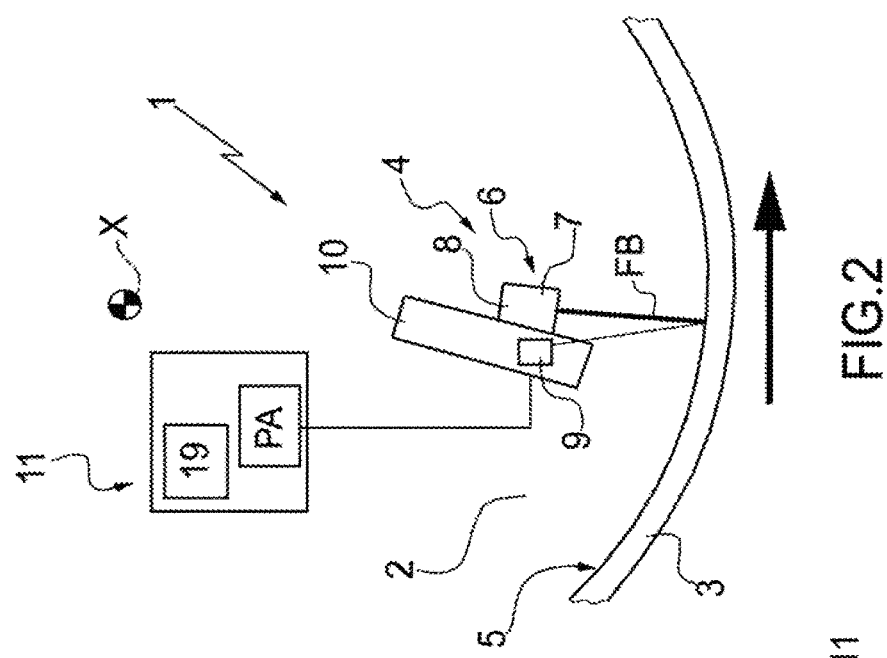
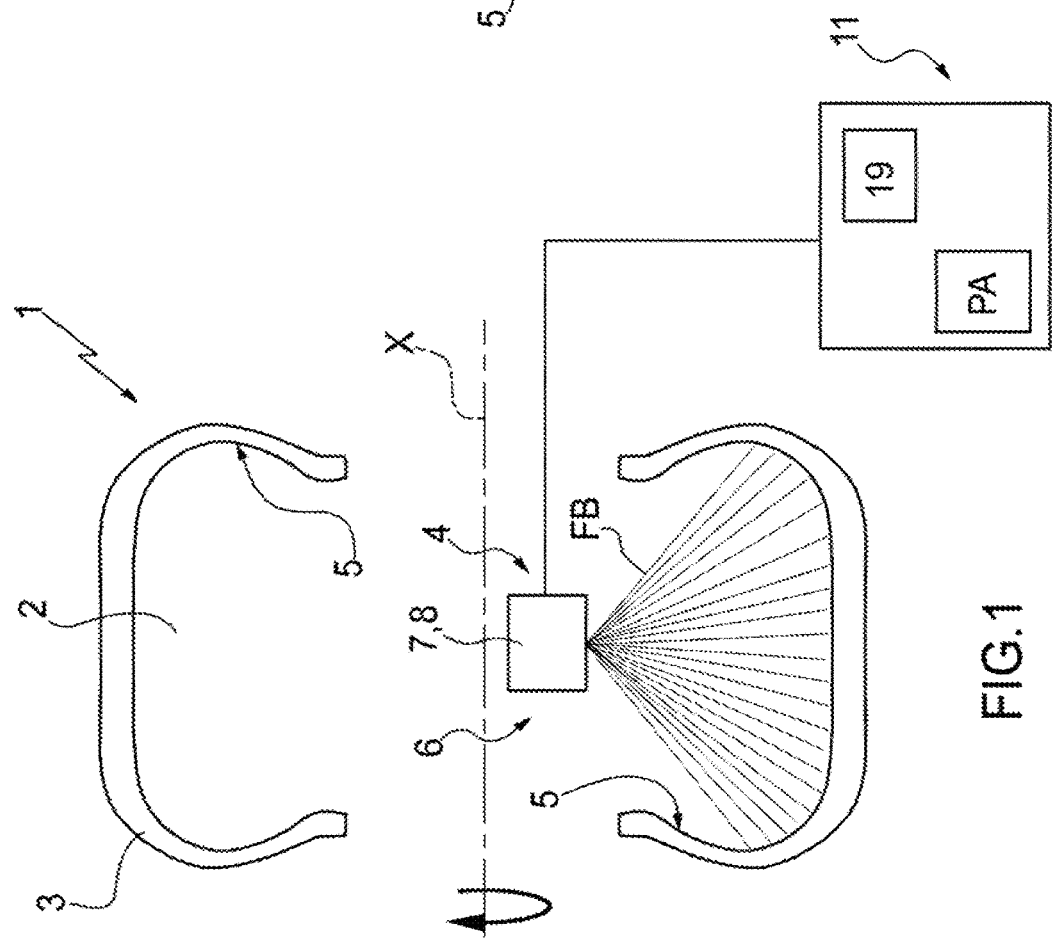

| Deg. | Point #1 | | | Point #2 | | | Point #3 | | | | Point #n | | |
|---|---|---|---|---|---|---|---|---|---|---|---|---|---|
| | X | Y | Z | X | Y | Z | X | Y | Z | | X | Y | Z |
| 0 | 85,6 | 57,8 | 45,4 | 85,2 | 56,9 | 45,2 | 85,2 | 56,9 | 45,2 | | 85,2 | 56,9 | 45,2 |
| 1 | 85,2 | 56,9 | 45,2 | 85,6 | 57,8 | 45,4 | 85,6 | 57,8 | 45,4 | | 85,6 | 57,8 | 45,4 |
| 2 | 85,6 | 57,8 | 45,4 | 85,2 | 56,9 | 45,2 | 85,2 | 56,9 | 45,2 | | 85,6 | 57,8 | 45,4 |
| ... | | | | | | | | | | | | | |
| 359 | 85,2 | 56,9 | 45,2 | 85,2 | 56,9 | 45,2 | 85,2 | 56,9 | 45,2 | | 85,6 | 57,8 | 45,4 |

FIG.4

METHOD AND SYSTEM FOR APPLYING A SEALING AGENT TO THE SURFACE OF AN INTERNAL CAVITY OF A PNEUMATIC TIRE

CROSS-REFERENCES TO RELATED APPLICATIONS

This is a divisional application of U.S. patent application Ser. No. 16/764,122, filed May 14, 2020, which is a 371 of PCT/IB2018/060281, filed Dec. 18, 2018, and further claims priority of Italian Patent Application No. 102017000147547, filed Dec. 20, 2017, each of which is herein incorporated by reference in its entirety.

FIELD OF THE INVENTION

The present invention relates to a method and a system for applying a sealing agent to the surface of an internal cavity of a pneumatic tire.

BACKGROUND

As it is known, a pneumatic tire comprises a toroidal casing, which has two annular beads and supports an annular tread. A tread belt is interposed between the casing and the tread belt, which comprises a number of tread plies. The casing then supports a pair of sidewalls (or side surfaces) arranged between the tread and the beads. An innerliner is arranged within the casing ply which is impermeable to air, constitutes an inner lining and has the function of retaining the air within the pneumatic tire in order to maintain the inflation pressure of the pneumatic tire itself over time.

In recent years pneumatic tire development has been directed towards pneumatic tires provided with an inner lining that is manufactured with a sealing agent that is intended to seal any punctures. Typically, the sealing agent has a high viscosity in order to ensure both the sealing action in relation to any holes and the stability thereof within the internal cavity regardless of the conditions of the pneumatic tire.

The sealing agent is applied to a pre-vulcanized pneumatic tire and preferably to the innerliner within the area of the pneumatic tire that comes into contact with the road (or the area of the pneumatic tire wherein punctures can potentially occur). In particular, the sealing agent is applied at the tread and at least partially at the sidewalls.

Typically, the process for applying the sealing agent provides for the arrangement of the pre-vulcanized pneumatic tire on a support wherein it is blocked by means of lateral rails in such a way as to prevent any lateral translation of the pneumatic tire itself.

In response to an operator command, the sealing agent application process is started by inserting a sealing agent applicator device within the internal cavity of the pneumatic tire in a position directly facing a surface of the internal cavity itself. The applicator device is conveniently implemented by means of a movable arm provided at one end of a nozzle and intended to apply a substantially uniform bead of sealing agent to the inner surface of the cavity. In particular, the applicator device is intended to apply a bead of sealing agent by means of a reciprocating movement between the two lateral ends of the internal cavity; in particular, the arm moves within a plane that is perpendicular to the equatorial plane of the pneumatic tire. The pneumatic tire is brought into rotation by the support by means of motorized rollers; the movement (continuous or else alternatively stepped) of the arm and the rotation of the pneumatic tire leads to the application of the sealing agent. Advantageously in the case of a continuous movement of the arm, the application of the sealing agent follows a helical progression.

The coordinates of the sealing agent application points are determined as a function of the dimensions of a reference pneumatic tire (i.e. of a "nominal" pneumatic tire); in other words, the arm of the applicator device moves within the cavity according to the coordinates of the application points of the reference pneumatic tire and not the actual coordinates of the pneumatic tire being processed.

It has been observed that known and currently used application systems do not make it possible to obtain elevated uniformity in regard to the thickness of the sealing agent that is applied to the surface of the internal cavity, i.e., the thickness of the sealing agent that is applied to the surface of the internal cavity can have appreciable variations from area to area. Consequently, in order to ensure that in every area of the surface of the internal cavity there is an adequate thickness (i.e., not less than a predetermined minimum threshold) it is necessary to apply an elevated average thickness (i.e. disproportionate) with a consequent increase in the cost and weight of the pneumatic tire (insofar as it is necessary to use a greater amount of sealing agent for each pneumatic tire). Furthermore, an uneven application of the sealing agent may also lead to an imbalance (i.e. eccentricity) in the overall mass of the pneumatic tire.

BRIEF SUMMARY

An object of the present disclosure is therefore to provide a system for applying a sealing agent to the surface of an internal cavity of a pneumatic tire that is free from the disadvantages of the state of the art and that is, in particular, easy and inexpensive to manufacture.

A further object of the present disclosure is to provide a method for applying a sealing agent to the surface of an internal cavity of a pneumatic tire that is free from the disadvantages of the state of the art and that is, in particular, easy and inexpensive to implement.

BRIEF DESCRIPTION OF THE DRAWINGS

The present invention is now described in reference to the attached drawings, which illustrate several non-limiting exemplary embodiments, wherein:

FIG. 1 is a schematic view, with parts removed for clarity, of a first variant of a system that has been implemented according to the present invention, in order to determine the profile of the internal cavity of a pneumatic tire;

FIG. 2 is a side view of a detail of FIG. 1;

FIG. 4 schematically illustrates the x, y and z reference coordinates of a plurality of points for each of the portions into which the surface of the internal cavity of a pneumatic tire is divided;

DETAILED DESCRIPTION

Figure 3:
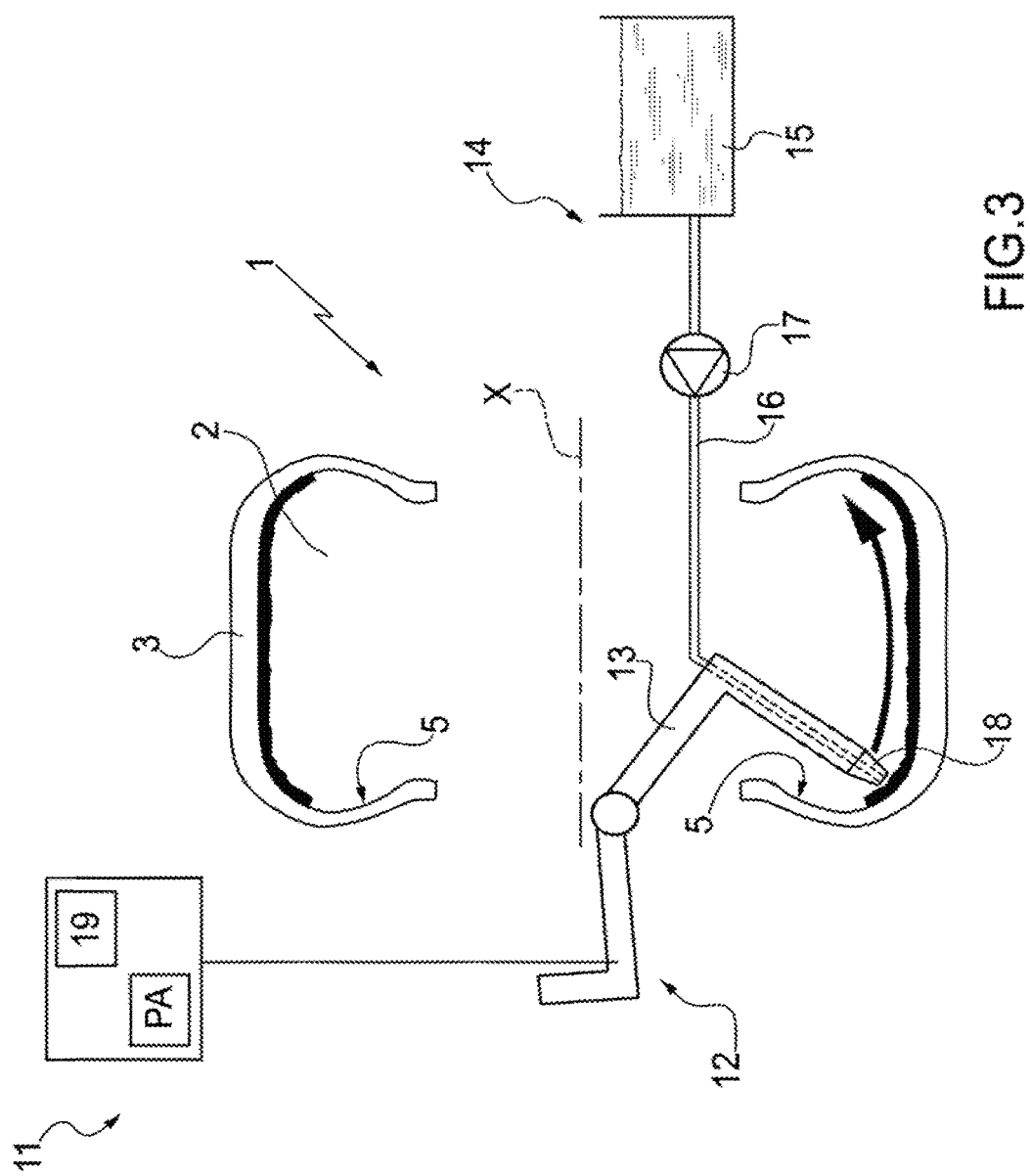
FIG. 3 is a schematic view, with parts removed for clarity, of a first variant of a system that has been implemented according to the present invention, for the application of a sealing agent to the surface of the internal cavity of a pneumatic tire.

With reference to FIG. 1, the number 1 denotes as a whole a system 1 configured in such a way as to determine the profile of the internal cavity 2 of a pneumatic tire 3 and, subsequently, for the application of a sealing agent to the surface 5 of said internal cavity 2. It is to be understood that "profile of the internal cavity 2 of a pneumatic tire 3" refers to a surface profile of the pneumatic tire 3.

The pneumatic tire 3 is arranged on a frame (not shown) that is able to support and bring into rotation, around the X axis thereof, the pneumatic tire 3 by means of motorized rollers. The frame is made to bring pneumatic tires 3 into rotation at a substantially constant speed and preferably between 1 and 15 m/min. Preferably, the pneumatic tire 3 is housed within the frame in such a way as to prevent any lateral translation of the pneumatic tire 3 itself during the rotation movement around the X axis. The system 1 is provided with an optoelectronic device 4, which is configured in such a way as to emit at least one light beam LB along a direction of emission. The optoelectronic device 4 is furthermore configured in such a way as to capture, or acquire (or detect) an image containing the line of light projected onto the surface 5 of the internal cavity 2.

The optoelectronic device 4 comprises an optical profilometer 6. The optical profilometer 6 in turn comprises an emitting device 7 that impacts the surface 5 so to project a line of light onto the surface 5 itself. The light beam LB is collimated onto a plane so that it is laminar and divergent, in such a way as to form a spectrum of light that traces the line of light over the affected surface 5. According to a preferred variant, the spectrum of light strikes a portion of the surface 5 that substantially corresponds to the cross-section of the surface 5 to which the sealing agent is to be subsequently applied. The light-emitting device 7 comprises a source 8 of laser light.

The optical profilometer 6 furthermore comprises a sensor element 9 configured in such a way as to acquire/capture the image contained within the line of light projected onto the affected surface 5 and to supply a signal that is indicative of the captured image. Conveniently, the sensor element 9 can comprise an image acquisition device, for example a microcamera.

According to what is shown in FIG. 2, the system 1 furthermore comprises an external enclosure 10, which is made in such a way as to house the optoelectronic device 4. The external enclosure 10 is made to be movable in such a way as to be moved and arranged in a detection position within the internal cavity 2 directly facing the surface 5. In the detection position the external enclosure 10 is directly facing the internal cavity 2, substantially at the center of the circumference defined by an equatorial plane of the pneumatic tire 3.

Conveniently, the sensor element 9 can be integrated into the external enclosure 10 in such a way that the photosensitive surface thereof may be arranged, in the detection position, directly facing the internal cavity 2.

The system 1 furthermore comprises an electronic processing system 11 that is configured in such a way as to receive signals from the sensor element 9 that are indicative of the captured images. The electronic processing system 11 is configured so as to process the signals that are indicative of captured images in order to determine the profile of the internal cavity 2 according to the lines of light contained within each image. Conveniently, the electronic processing system 11 is configured in such a way as to determine the profile of the internal cavity 2 in implementing a PA algorithm that digitally processes the captured images.

The automatic movement of the frame that supports and carries the pneumatic tire 3 through a rotation of 360° around the X axis (whilst the external enclosure 10 is stationary) allows the electronic processing system 11 to perform a surface scan of a number of portions of the surface 5 that are uniformly distributed around the X axis and in a number, for example, equal to 360 (i.e., one for each degree of rotation around the X axis).

Advantageously, the electronic processing system 11 is configured in such a way as to perform, for each portion of the surface 5, an x, y and z three dimensional scan for a plurality of points into which each portion is divided. The maximum measurable dimensions are in the order of one millimeter.

According to what is shown in FIG. 4, the electronic processing system 11 is configured in such a way as to perform the three dimensional scan of the surface 5 in such a way as to identify the x, y, and z reference coordinates of a plurality of points (indicated with Point #1, Point #2, . . . . Point #) for 360 portions (indicated with Deg. from 0 to 359) of said surface 5.

As shown in FIG. 3, the system 1 furthermore comprises a sealing agent applicator device 12 which is conveniently implemented by means of a robot provided with an arm 13 that is movable and intended to apply a substantially uniform bead of sealing agent to the surface 5. According to a preferred embodiment, the arm 13 does not coincide with the external enclosure 10 made to house the optoelectronic device 4. According to a second variant, the sealing agent applicator device 12 and the optoelectronic device 4 may be housed within a common enclosure.

The applicator device 12 is intended to apply a bead of sealing agent by means of a reciprocating movement between the two lateral ends of the internal cavity 2; in particular, the arm 13 moves in a plane that is perpendicular to the equatorial plane of the pneumatic tire 3. The rotation of the frame around the X axis and the movement of the arm 13 lead to an application with a helical progression. More specifically, the applicator device 12 is intended to apply a bead of sealing agent at the portion of the pneumatic tire 3 that is intended to come into contact with the road, i.e., at the tread strip and, at least partially, at the sidewalls.

The applicator device 12 is connected to a circuit 14 supplying the sealing agent comprising a tank 15, preferably manufactured from a metallic material and containing the sealing agent, a conduit 16 that is preferably heated and that originates from the tank 15 and that is in hydraulic communication with the applicator device 12, and a pumping member 17 that draws the sealing agent from the tank and supplies it under pressure to the applicator device 12.

According to a preferred variant, the applicator device 12 is implemented by means of a nozzle 18 in order to perform the non-contact application of the sealing agent in the semifluid state; the nozzle 18 is preferably arranged at one axial end of the movable arm 13.

Once the three dimensional scan has been performed for each portion of the surface 5 and the profile of the internal cavity 2 has been acquired, the electronic processing system 11 is able to calculate the movement of the nozzle 18 in applying the sealing agent as a function of said profile.

The electronic processing system 11 is in fact configured in such a way as to drive the arm 13 as a function of the acquired profile of the internal cavity 2. In particular, the electronic processing system 11 is configured in such a way as to drive the arm 13 so as to vary the distance of the nozzle 18 from the surface 5 and hold the distance between the nozzle 18 and the surface 5 substantially constant. It should be emphasized that by holding the distance between the nozzle 18 and the surface 5 substantially constant it is possible to implement a more uniform application in terms of the thickness and width of the bead and in terms of the precision of the sealing agent application area.

Conveniently, the electronic processing system 11 may comprise an operator interface 19, such as a control panel and/or a display or similar, by means of which the operator can control the internal cavity 2 profile scanning process and the application of the sealing agent.

Hereinafter there will be described a method of operation of the system 1, which includes, in succession, the following steps:
- an operator or alternatively an automatic manipulator arranges the pneumatic tire 3 on the support and blocks it by means of side rails in such a way as to prevent any lateral translation of the pneumatic tire 3 itself;
- in response to an operator command given, for example, thorough the operator interface 19, the optoelectronic device 4 is arranged in the detection position it being inserted within the internal cavity 2;
- whilst the pneumatic tire 3 is brought into rotation around the X axis by means the of frame, the detection of the internal cavity 2 profile begins; by means of the emitter device 7 the optoelectronic device 4 emits the light beam LB so as to project the line of light onto the surface 5 and to collect, by means of the sensor element 9, for each of the 360 portions of the surface 5, the reflected images containing the projected line of light;
- the optoelectronic device 4 transfers the acquired images in digital format, in the form of data or else encoded as electrical signals, to the electronic processing system 11;
- at the end of the internal cavity 2 profile detection step (when the pneumatic tire 3 has completed a rotation of) 360°, the support is stopped so that the optoelectronic device 4 may be extracted from the internal cavity 2;
- the electronic processing system 11, by means of the PA algorithm that digitally processes the acquired images, performs a three dimensional scan of the internal cavity 2 and determines the reference coordinates of the sealing agent application points of the device 12 for each portion of the surface 5 as a function of said scan;
- the applicator device 12 is inserted into the internal cavity 2;
- the nozzle 18 is moved to an initial position in order to being the application of the sealing agent;
- the pneumatic tire 3 is brought into rotation around the X axis by the frame whilst the nozzle 18 begins the application of the sealing agent;
- during the rotation of the pneumatic tire 3 around the X axis, the nozzle 18 moves, following the reference coordinates of the sealing agent application points in such a way as to hold the distance between the nozzle 18 and the surface 5 substantially constant, and to render a substantially uniform application to the surface 5; as a function of the movement of the applicator device 12 (continuous or else alternatively stepped), the application of the sealing agent may or may not have a helical progression;
- at the end of the step of applying the sealing agent to the surface (when the pneumatic tire 3 has completed a series of 360° rotations in order to obtain the helical progression of the sealing agent), the support is arrested in such a way that the applicator device 12 comes out from the internal cavity 2 and the pneumatic tire 3 can be extracted from the support.

According to a preferred embodiment, the electronic processing system 11 is configured in such a way as to determine, at the end of internal cavity 2 profile detection step, the normalized average profile of the portions of the surface 5 as a function of the three-dimensional scan performed for the entirety of the internal cavity 2. During the rotation of the pneumatic tire 3, the nozzle 18 moves, following the average profile of the sections in order to perform the application of the sealing agent.

Figure 5:
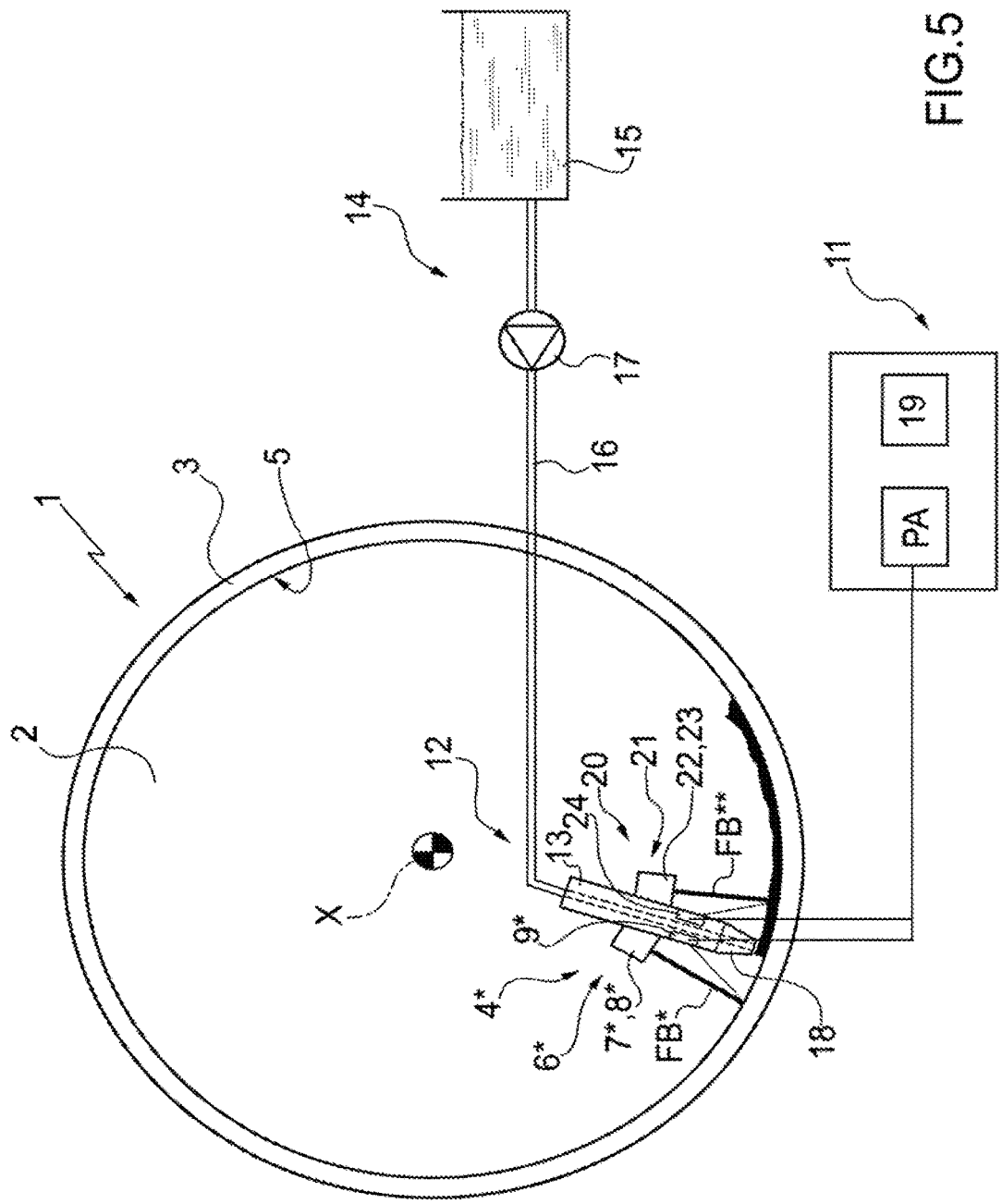
FIG. 5 is a schematic view, with parts removed for clarity, of a second variant of a system that has been implemented according to the present invention, in order to determine the profile of the internal cavity of a pneumatic tire and for the application of a sealing agent to the surface of said cavity.
Figure 6:
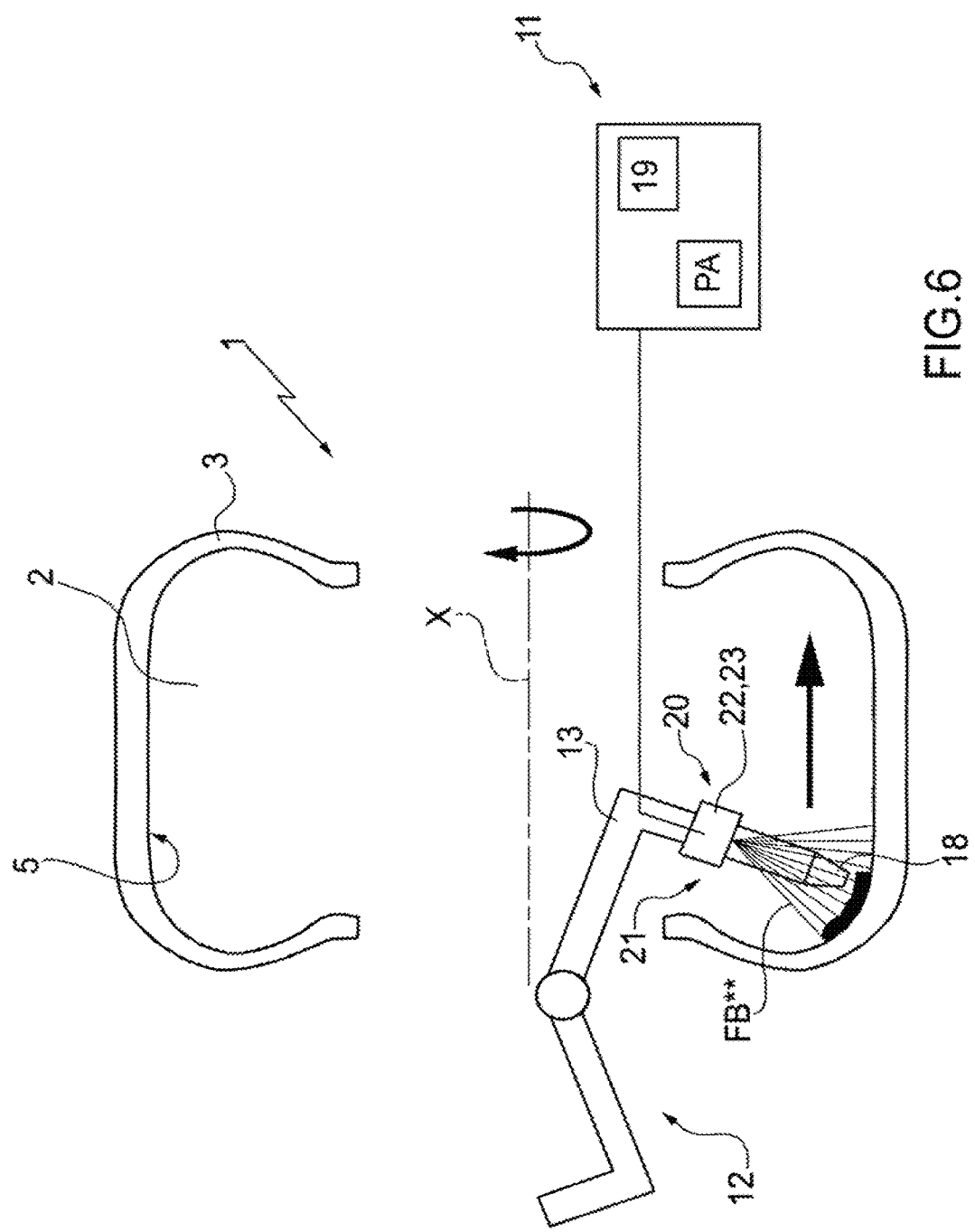
FIG. 6 is an additional schematic view and with parts removed for clarity of the system of FIG. 5.

Shown as a whole in FIGS. 5 and 6 is a second embodiment of the system 1 configured in order to determine the profile of the internal cavity 2 of the pneumatic tire 3, and subsequently, the application of a sealing agent to the surface 5 of said internal cavity 2, as a comparison to the system shown in FIGS. 1 to 4 and the corresponding parts are color coded, wherever possible, with the same reference numbers.

The pneumatic tire 3 is installed on a frame (not shown) that is able to support and bring into rotation around the X axis thereof, the pneumatic tire 3 by means of motorized rollers. The frame is made to bring pneumatic tires 3 into rotation at a substantially constant speed and preferably between 1 and 15 m/min. Preferably, the pneumatic tire 3 is housed within the frame in such a way as to prevent any lateral translation of the pneumatic tire 3 itself during the rotation movement around the X axis.

The system 1 furthermore comprises a sealing agent applicator device 12 which is conveniently implemented by means of a robot provided with an arm 13 that is movable and intended to apply a substantially uniform bead of sealing agent to the surface 5. In particular, the applicator device 12 is intended to apply a bead of sealing agent by means of a reciprocating movement between the two lateral ends of the internal cavity; in particular, the arm moves in a plane that is perpendicular to the equatorial plane of the pneumatic tire 3.

The rotation of the frame around the X axis and the movement of the arm 13 (continuous or else alternatively stepped) lead to the application of the sealing agent which may (in the case of a continuous movement) or may not (in the case of a stepped movement) have a helical progression. More specifically, the applicator device 12 is intended to apply a bead of sealing agent at the portion of the pneumatic tire 3 that is intended to come into contact with the road, i.e., at the tread strip and, at least partially, at the sidewalls. The applicator device 12 is connected to a circuit 14 supplying the sealing agent comprising a tank 15, preferably manufactured from a metallic material and containing the sealing agent, a conduit 16 that is preferably heated and that originates from the tank 15 and that is in hydraulic communication with the applicator device 12, and a pumping member 17 that draws the sealing agent from the tank 15 and supplies it under pressure to the applicator device 12.

According to a preferred variant, the applicator device 12 is implemented by means of a nozzle 18 in order to perform the non-contact application of the sealing agent in the semifluid state; the nozzle 18 is preferably arranged at one axial end of the movable arm 13.

The system 1 is further provided with an optoelectronic device 4\*, which is housed within the movable arm 13 and which is configured in such a way as to emit at least one light beam LB\* along an emission direction.

The optoelectronic device 4* is furthermore configured in such a way as to capture, or acquire (or detect) an image containing the line of light projected onto the surface 5 of the internal cavity 2. In relation to the direction of rotation of the pneumatic tire 3, the optoelectronic device 4* is arranged immediately upstream of the nozzle 18; in other words, the optoelectronic device 4* is arranged in relation to the nozzle 18 so that each portion of the surface 5 to be coated with the sealing agent is first impacted by the light beam LB* emitted by the optoelectronic device 4* and then by the bead of sealing agent emitted from the nozzle 18.

The optoelectronic device 4* comprises an optical profilometer 6*. The optical profilometer 6* comprises a light-emitting device 7* in such a way as to emit/generate the light beam LB. The light beam LB is collimated onto a plane so that it is laminar and divergent, in such a way as to form a spectrum of light that traces a line of light over the affected surface 5. According to a preferred variant, the spectrum of light impacts a portion of the surface 5 to which the sealing agent is to be subsequently applied. It is beneficial to point out that the light beam LB* impacts upon only a portion of the cross-section of the surface 5 upon which to apply the sealing agent.

The light-emitting device 7* comprises a source 8* of laser light.

The optical profilometer 6* furthermore comprises a sensor element 9* configured in such a way as to acquire/capture the image contained within the line of light projected onto the impacted surface 5 and to supply a signal that is indicative of the captured image. Conveniently, the sensor element 9* can comprise an image acquisition device, for example a micro-camera.

The system 1 is provided with an additional optoelectronic device 20, which is housed within the movable arm 13 and which is configured in such a way as to emit at least one light beam LB along an emission direction. The optoelectronic device 20 is furthermore configured in such a way as to capture, or acquire (or detect) an image containing the line of light projected onto the surface 5 of the internal cavity 2. In relation to the direction of rotation of the pneumatic tire 3, the optoelectronic device 20 is arranged immediately downstream of the nozzle 18; in other words, the optoelectronic device 20 is arranged in relation to the nozzle 18 so that each portion of the surface 5 to be coated with the sealing agent is first impacted by the bead of sealing agent emitted from the nozzle 18 and then by the light beam LB emitted by the optoelectronic device 20.

In other words, the applicator device 12 (and, consequently, the nozzle 18) is interposed between the optoelectronic device 4* and the optoelectronic device 20.

The optoelectronic device 20 comprises an optical profilometer 21. The optical profilometer 21 in turn comprises a light-emitting device 22 configured in such a way as to emit/generate the light beam LB. The light beam LB is collimated onto a plane so that it is laminar and divergent, in such a way as to form a spectrum of light that traces the line of light over the affected surface 5. According to a preferred variant, the spectrum of light impacts a portion of the surface 5 to which the sealing agent is to be subsequently applied. It is beneficial to point out that the light beam LB** impacts upon only a portion of the cross-section of the surface 5 upon which the sealing agent has been applied. The light-emitting device 22 comprises a source 23 of laser light.

The optical profilometer 21 furthermore comprises a sensor element 24 configured in such a way as to acquire/capture the image contained within the line of light projected onto the impacted surface 5 and to supply a signal that is indicative of the captured image. Conveniently, the sensor element 24 can comprise an image acquisition device, for example a micro-camera.

The system 1 furthermore comprises an electronic processing system 11 that is configured to receive from both the optoelectronic device 4* and the optoelectronic device 20 (namely from the respective sensor elements indicated with 9* and 24) the signals that are indicative of captured images.

With particular reference to the optoelectronic device 4*, the electronic processing system 11 is configured in such a way as to process the signal that is indicative of each captured image in order to determine the profile of the corresponding portion of the surface 5 as a function of the line of light contained within said image. Conveniently, the electronic processing system 11 is configured in such a way as to determine the profile of each portion of the surface 5 in implementing a PA algorithm that digitally processes the corresponding captured image. The maximum measurable dimensions are in the order of one millimeter.

Once the profile of the corresponding portion of the surface 5 has been determined, the processing PA algorithm is able to control the open loop application of the sealing agent. In particular, the processing PA algorithm is able to calculate the movement of the sealing agent application nozzle 18 as a function of said profile. The electronic processing system 11 is configured in such a way as to drive the arm 13 as a function of the acquired profile of the portion of the surface 5. In particular, the electronic processing system 11 is configured in such a way as to drive the arm 13 so as to vary the distance of the nozzle 18 from the surface 5 and hold the distance between the nozzle 18 and the surface 5 substantially constant.

With particular reference to the optoelectronic device 20, the electronic processing system 11 is in contrast configured in such a way as to process the signal that is indicative of each captured image with the aim of verifying the application of the sealing agent onto the corresponding portion of the surface 5 as a function of the line of light contained within said image.

Conveniently, the electronic processing system 11 is configured in such a way as to determine the profile of each portion of the surface 5 after the application of the sealing agent in implementing a PA algorithm that digitally processes the corresponding captured image. The maximum measurable dimensions are in the order of one millimeter.

Once the profile of each portion of the surface 5 has been determined, after the application of the sealing agent, the processing PA algorithm is able to control the open loop application of the sealing agent. In particular, the processing PA algorithm is able to correct any variations in the application of the sealing agent as a function of the profile of each portion of the surface 5 after the application of the sealing agent. Advantageously, in order to correct any variations in the application of the sealing agent, the processing PA algorithm is able to intervene on the circuit 14 supplying the sealing agent.

In the event that very rapid fluctuations/periodic variations are detected (fluctuations of a limited period), the processing PA algorithm is configured so as to drive the arm 13 in such a way as to vary/adjust the distance of the nozzle 18 from the surface 5; preferably, the processing PA algorithm is configured in order to hold the distance between the nozzle 18 and surface 5 substantially constant.

If by contrast somewhat slow fluctuations/periodic variations are detected (fluctuations of a prolonged period), the processing PA algorithm is able to modify the parameters of the supply process and extrusion of the sealing agent (intervening in the flow rate and sealing agent extrusion rate).

Conveniently, the electronic processing system 11 may comprise an operator interface 19, such as a control panel and/or a display or similar, by means of which the operator can control the internal cavity 2 profile scanning process and the application of the sealing agent.

Hereinafter there will be described a method of operation of the system 1, which includes, in succession, the following steps:

an operator or alternatively an automatic handler arranges the pneumatic tire 3 on the support and blocks it by means of the side rails in such a way as to prevent any lateral translation of the pneumatic tire 3 itself;

in response to an operator command sent, for example, by means of the operator interface 19, the arm 13 is inserted into the internal cavity 2;

the pneumatic tire 3 is brought into rotation by the support around the X axis;

by means of the emitter device 7* the optoelectronic unit 4* emits the light beam LB* so as to project the line of light onto the surface 5 and to collect, by means of the sensor element 9*, the reflected image containing the corresponding projected line of light;

the optoelectronic device 4* transfers each acquired image in digital format, in the form of data or else encoded as electrical signals, to the electronic processing system 11;

the electronic processing system 11, by means of the PA algorithm that digitally processes the acquired images determines the profile of each portion of the surface 5 and calculates the movement of the sealing agent application nozzle 18 as a function of said profile; the nozzle 18 implements the application of the sealing agent;

by means of the emitter device 22 the optoelectronic unit 20 emits the light beam LB** so as to project the line of light onto the surface 5 and to collect, by means of the sensor element 24, the reflected image containing the corresponding projected line of light;

the optoelectronic device 20 transfers each acquired image in digital format, in the form of data or else encoded as electrical signals, to the electronic processing system 11;

the electronic processing system 11, by means of the PA algorithm that digitally processes the acquired images determines the profile of each portion of the surface 5 after the application of the sealing agent and corrects any variations in application of the sealing agent as a function of said profile of each portion of the surface 5 after the application of the sealing agent.

A third variant (not shown) of the system 1 is provided, which is configured in such a way as to determine the profile of the internal cavity 2 of a pneumatic tire 3 and, subsequently, for the application of a sealing agent to the surface 5 of said internal cavity 2. The third variant provides for the use of an optoelectronic device 4 of the type described in the preceding discussion, housed within the movable external enclosure 10 so that it can be moved and arranged in a detection position within the internal cavity 2 directly facing the surface 5. The optoelectronic device 4 is connected to the electronic processing system 11 in order to perform the three dimensional scan of each portion of the surface 5 and to acquire the profile of the entire internal cavity 2. The third variant furthermore provides for the use of the sealing agent applicator device 12 which is conveniently implemented by means of a robot provided with an arm 13 that is movable and provided with a nozzle 18 intended to apply a substantially uniform bead of sealing agent to the surface 5. Housed within the arm 13 are both the optoelectronic device 4* arranged immediately upstream in relation to the nozzle 18, so that each portion of the surface 5 to be coated with the sealing agent is firstly impacted by the light beam LB* emitted by the optoelectronic device 4* and then by the bead of sealing agent emitted from the nozzle 18, and the optoelectronic device 20 arranged immediately downstream in relation to the nozzle 18, so that each portion of the surface 5 is both firstly coated with the bead of sealing agent emitted from the nozzle 18 and then impacted by the light beam LB** emitted by the optoelectronic device 4*. The variant just described therefore provides for the use of three optical profilometers 6, 6* and 21.

Once the profile of the entire internal cavity 2 has been determined by means of the optoelectronic device 4, the electronic processing system 11 is then able to control both the open loop application of the sealing agent by means of the optoelectronic device 4* and the closed loop application of the sealing agent in order to correct any variations in the application of said sealing agent by means of the optoelectronic device 20.

The advantages of the different systems 1 described in the preceding discussion are evident.

In particular, the use of the optoelectronic devices, 4, 4*, 20 provided with the respective optical profilometers 6, 6* and 21 makes it possible to perform a very uniform application (in terms of the thickness and width of the bead and in terms of the accuracy of the sealing agent area of application) of the sealing agent to the surface 5 insofar as they take into account the actual profile of the internal cavity 2 of the pneumatic tire 3, i.e., they take into consideration any differences that may exist following the process of vulcanizing the pneumatic tire 3, such as bumps and protrusions and those generated during the handling of the pneumatic tire 3 (specifically, the lateral blocking of the support and the rotation imparted by the support by means of the motorized rollers) in addition to those variations generated by fluctuations in the flow of the sealing agent within the supply circuit.

In other words, internally, pneumatic tires have measurable and significant deformities in relation to tolerances due to the presence of bumps and protrusions that can inevitably be created especially during the vulcanization process. Furthermore, the pneumatic tire handling steps (in particular, the lateral blocking of the support and the rotation imparted by the support using the motorized rollers) also cause the profiles of the internal cavities of pneumatic tires that are being processed to deviate from the profiles of the reference pneumatic tire. Applying the sealing agent without taking into consideration the actual profile of the internal cavity of the pneumatic tires determines a marked lack of homogeneity regarding the thickness of the sealing agent.

Furthermore, fluctuations in the flow of the sealing agent that are generated within the supply circuit often result in variations in the thickness and width of the strip of sealing agent that is applied to the internal cavity of the pneumatic tire; consequently, applying the sealing agent without taking into consideration fluctuations in the flow of the sealing agent that are generated within the supply circuit determines a certain lack of homogeneity regarding the thickness of the sealing agent.

What is claimed is:

1. A method for applying a sealing agent to a surface of an internal cavity of a pneumatic tire, the method comprising:

inserting an optoelectronic device into the internal cavity of the pneumatic tire;
rotating the pneumatic tire at least 360 degrees about a first axis, to acquire a plurality of captured images from the optoelectronic device and to perform a three-dimensional surface scan of a plurality of portions of the surface that are uniformly distributed 360 degrees about the first axis, and thereby identify x, y, and z reference coordinates of a plurality of points into which each portion is divided as a function of the respective images;
determining a profile of an interior surface of the tire from the plurality of captured images and the identified x, y, and z reference coordinates;
extracting the optoelectronic device from the internal cavity of the pneumatic tire upon completion of the three-dimensional surface scan;
calculating movements of an applicator device comprising a nozzle throughout application of a strip of sealing agent to the surface as a function of the identified three-dimensional reference coordinates of the entire internal cavity to maintain a constant distance between the applicator device and the surface;
inserting the applicator device into the internal cavity; and
driving the applicator device as a function of the calculated movements.

2. The method of claim 1, further comprising:
generating a light beam that impacts the surface so to project onto the surface a line of light; and
acquiring the plurality of captured images, each containing the line of light projected onto the surface.

3. The method of claim 2, wherein the generated light beam comprises laser light.

4. The method of claim 2, wherein the light beam is collimated onto a plane in such a way as to form a spectrum of light that traces a line of light over the impacted surface, impacting a portion of the surface that substantially corresponds to the transverse portion of the surface upon which the sealing agent is to be applied.

5. The method of claim 1, comprising:
determining a normalized average profile of the plurality of portions into which the surface is divided; and
applying the strip of sealing agent on the surface as a function of the normalized average portion.

6. The method of claim 1, wherein the nozzle is arranged at a certain distance from the surface in order to perform a non-contact application of the sealing agent in a semifluid state.

7. The method of claim 6, wherein the applicator device comprises a movable arm that supports the nozzle at one end.

8. The method of claim 1, comprising moving an enclosure for supporting the optoelectronic device, in such a way as to be arranged within the internal cavity directly facing the surface.

9. The method of claim 1, comprising capturing a second plurality of images of the applied sealing agent on the entire surface and providing a plurality of signals that are indicative of the second plurality of captured images.

* * * * *